(12) United States Patent
Weng et al.

(10) Patent No.: US 12,181,683 B2
(45) Date of Patent: Dec. 31, 2024

(54) OPTICAL SYSTEM

(71) Applicant: TDK TAIWAN CORP., Taoyuan (TW)

(72) Inventors: Chih-Wei Weng, Taoyuan (TW); Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/467,260

(22) Filed: Sep. 14, 2023

(65) Prior Publication Data

US 2024/0094551 A1 Mar. 21, 2024

Related U.S. Application Data

(60) Provisional application No. 63/406,916, filed on Sep. 15, 2022.

(51) Int. Cl.
| | |
|---|---|
| G02B 27/01 | (2006.01) |
| F21V 8/00 | (2006.01) |
| G02B 7/08 | (2021.01) |
| G02B 7/36 | (2021.01) |
| G02B 27/64 | (2006.01) |
| G03B 5/00 | (2021.01) |
| G06F 3/01 | (2006.01) |
| G09G 3/00 | (2006.01) |
| H01F 7/08 | (2006.01) |
| H04N 23/54 | (2023.01) |

(Continued)

(52) U.S. Cl.
CPC ....... *G02B 27/0176* (2013.01); *G02B 6/0006* (2013.01); *G02B 6/0028* (2013.01); *G02B 7/08* (2013.01); *G02B 7/36* (2013.01); *G02B 27/0172* (2013.01); *G02B 27/0179* (2013.01); *G02B 27/646* (2013.01); *G03B 5/00* (2013.01); *G06F 3/013* (2013.01); *G09G 3/001* (2013.01); *H01F 7/081* (2013.01); *H04N 23/54* (2023.01); *H04N 23/55* (2023.01); *H04N 23/6812* (2023.01); *G02B 2027/0112* (2013.01); *G02B 2027/015* (2013.01); *G02B 2027/0159* (2013.01); *G02B 2027/0178* (2013.01); *G02B 2027/0187* (2013.01); *G02B 2207/101* (2013.01); *G03B 2205/0076* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 10,901,225 B1 * | 1/2021 | De Nardi | G02B 27/0093 |
| 2013/0088413 A1 * | 4/2013 | Raffle | G09G 3/003 |
| | | | 359/630 |

* cited by examiner

*Primary Examiner* — Carl Adams

(74) *Attorney, Agent, or Firm* — Muncy, Geissler, Olds & Lowe, P.C.

(57) ABSTRACT

An optical system is provided. The optical system includes a light source used for generating light, a fixed portion, an optical assembly having an equivalent focal length to the light and including a first optical element and a second optical element, and a driving assembly used for driving the second optical element to move relative to the first optical element. The driving assembly includes a first driving element used for driving the second optical element to move relative to the first optical element in a first axis, and a second driving element used for driving the second optical element to move relative to the first optical element in a second axis. The first axis and the second axis are different.

18 Claims, 14 Drawing Sheets

(51) Int. Cl.
*H04N 23/55* (2023.01)
*H04N 23/68* (2023.01)

OPTICAL SYSTEM

CROSS REFERENCE TO RELATED APPLICATIONS

This application claims the benefit of U.S. Provisional Application No. 63/406,916, filed Sep. 15, 2022, the entirety of which is incorporated by reference herein.

BACKGROUND OF THE INVENTION

Field of the Invention

The present invention relates to an optical system.

Description of the Related Art

Augmented Reality (AR) is a technology that combines elements of the virtual world with the real world, allowing users to place virtual objects or information into their real environment through the camera lens of a device. Current AR optical systems are primarily based on optical projection technology, typically using a camera to capture images from the real world and a projector to deliver virtual content, thereby superimposing virtual elements onto the user's field of view along with the images from the real world.

Virtual Reality (VR) is a simulated virtual environment created through computer technology and sensor techniques, allowing users to experience a sense of being present in that environment. The optical system of virtual reality is one of the key technologies within VR, responsible for capturing, processing, and delivering visual information, enabling users to perceive realistic virtual scenes. Mixed Reality (MR) is a technology that combines elements of both virtual reality and augmented reality.

However, current augmented reality, virtual reality, or mixed reality devices typically require large and bulky optical assemblies, which limit their portability and user comfort. Users may not want to wear oversized devices on their heads, thus improving the size of augmented reality optical systems is an important challenge.

BRIEF SUMMARY OF THE INVENTION

An optical system is provided. The optical system includes a light source used for generating light, a fixed portion, an optical assembly having an equivalent focal length to the light and including a first optical element and a second optical element, and a driving assembly used for driving the second optical element to move relative to the first optical element. The driving assembly includes a first driving element used for driving the second optical element to move relative to the first optical element in a first axis, and a second driving element used for driving the second optical element to move relative to the first optical element in a second axis. The first axis and the second axis are different.

In some embodiments, the optical system further includes a guiding assembly disposed on the second optical element and including a first guiding element and a second guiding element. The second optical element is polygonal. The second optical element includes a first side, a second side, a third side, and a fourth side. The first side and the second side are adjacent. The second side and the third side are adjacent. The third side and the fourth side are adjacent. The fourth side and the first side are adjacent. The first guiding element is disposed on the first side. The second guiding element is disposed on the second side.

In some embodiments, the first driving element is disposed on the fourth side. The second driving element is disposed on the third side.

In some embodiments, the first guiding element is disposed on a first corner of the second optical element. The second guiding element is disposed on the first corner.

In some embodiments, the first driving element is disposed on a second corner of the second optical element. The second driving element is disposed on the second corner. The first corner and the second corner are different.

In some embodiments, the first guiding element extends along the first axis. The second guiding element extends along the second axis.

In some embodiments, the optical system further includes a buffering assembly disposed between the first optical element and the second optical element. The buffering assembly includes a first buffering element and a second buffering element disposed on the first corner and the second corner, respectively.

In some embodiments, wherein the first buffering element and the second buffering element include elastic material.

In some embodiments, the optical system further includes a locking assembly used for fixing the second optical element and disposed on a third corner of the second optical element.

In some embodiments, the first corner and the third corner are different. The second corner and the third corner are different. The locking assembly is disposed on the second side.

In some embodiments, the locking assembly includes a locking element and a locking connection element. The locking connection element is fixed on the second optical element. The locking element is disposed on the locking connection element.

In some embodiments, the locking assembly allows the second optical element to move relative to the locking assembly when the driving assembly is in operation. The locking assembly is fixed on the second optical element when the driving assembly is not in operation.

In some embodiments, the first driving element is disposed on the second optical element and used for driving the second optical element to move in the first axis. The second driving element is disposed on the first driving element and used for driving the first driving element and the second optical element to move together in the second axis.

In some embodiments, the first optical element and the second optical element are arranged in a third axis. The first axis and the third axis are different. The second axis and the third axis are different.

In some embodiments, the first driving element includes piezoelectric element. The second driving element includes piezoelectric element. The first axis and the third axis are perpendicular. The second axis and the third axis are perpendicular.

In some embodiments, the optical system further includes a sensing assembly, including a first sensing element, a second sensing element, and a third sensing element. The first sensing element and the second sensing element are disposed on different sides of the second optical element. The first sensing element and the third sensing element are disposed on different sides of the second optical element.

In some embodiments, wherein the second sensing element and the third sensing element are disposed on different sides of the second optical element.

In some embodiments, the first driving element includes shape memory alloy. The second driving element includes shape memory alloy.

In some embodiments, the first driving element includes a first driving unit and a second driving unit. The second driving element includes a third driving unit and a fourth driving unit. The second optical element includes a first side, a second side, a third side, and a fourth side. The first side and the second side are adjacent. The second side and the third side are adjacent. The third side and the fourth side are adjacent. The fourth side and the first side are adjacent. The first driving element is disposed on the first side. The second driving element is disposed on the third side. The third driving element is disposed on the second side. The fourth driving element is disposed on the fourth side.

In some embodiments, a resilient element connects to the driving assembly. The resilient element is disposed between the fixed portion and the second optical element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
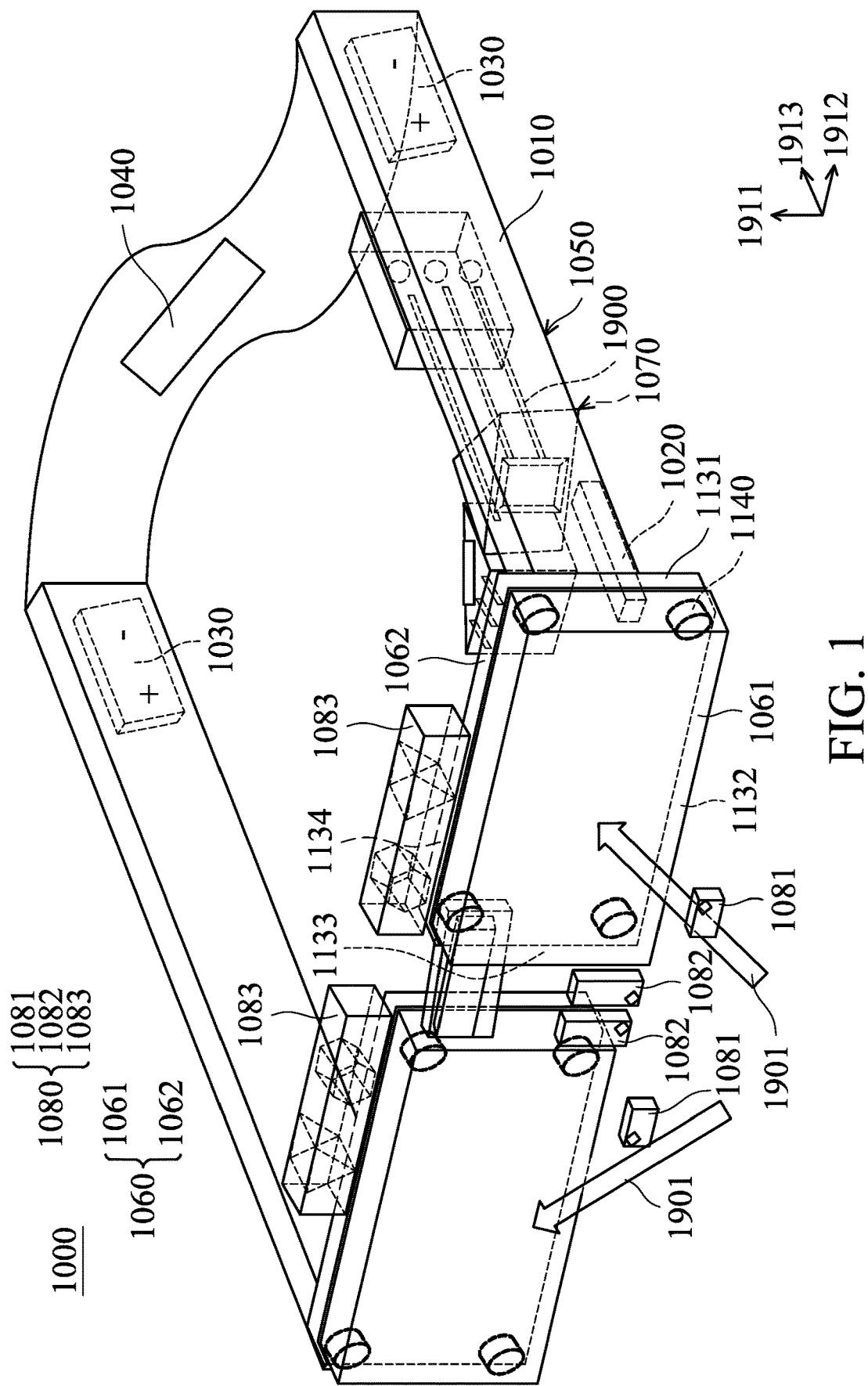
FIG. 1 is a schematic view of an optical system in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

An optical system is provided in some embodiments of the present disclosure, especially an optical system with augmented reality (AR), virtual reality (VR), or mixed reality (MR) function. For example, FIG. 1 is a schematic view of an optical system 1000 in some embodiments of the present disclosure. As shown in FIG. 1, the optical system 1000 may include a frame 1010 (fixed portion) and elements disposed on the frame 1010, such as may include a control element 1020, a energy storage element 1030, a memory element 1040, a light source assembly 1050, a optical path adjustment element 1070 (which includes a optical assembly 1060), and a sensing assembly 1080, etc.

In some embodiments, the control element 1020 may be used for processing signals of the optical system 1000 and may electrically connect to the energy storage element 1030, the memory element 1040, the optical path adjustment element 1070, and the light source assembly 1050, etc. The control element 1020 may include general processor, chip multiprocessor (CMP), dedicated processor, embedded processor, digital signal processor (DSP), network processor, input/output (I/O) processor, media access control (MAC) processor, radio baseband processor, co-processor, such as complex instruction set computer (CISC) microprocessor, reduced instruction set computing (RISC) microprocessor, and/or very long instruction word (VLIW) microprocessor, or other processing devices for microprocessors. Processors may also include controllers, microcontrollers, application-specific integrated circuits (ASIC), field-programmable gate arrays (FPGA), programmable logic devices (PLD), etc.

In some embodiments, the energy storage element 1030 may include batteries (including lithium-ion batteries, such as lithium ternary batteries, lithium manganese batteries, lithium cobalt batteries, lithium iron batteries, etc.), power management chips (such as power management integrated circuit, PMIC chips), etc., to supply the energy required for the operation of various elements in the optical system 1000. In some embodiments, the energy storage element 1030 may be charged through a port (not shown).

In some embodiments, the memory element 1040 may be used to store the information required for the operation of the optical system 1000. In some embodiments, the memory element 1040 may include memory devices such as Dynamic Random Access Memory (DRAM) chips, Static Random Access Memory (SRAM) chips, High Bandwidth Memory (HBM) chips, and the like. In some embodiments, the memory element 1040 may also include hard drives, disks, memory cards, or any other type of media suitable for storing information.

In some embodiments, the light source assembly 1050 may be used to emit light 1900. The light 1900 may, for example, include a virtual image that may be combined with real images to provide an augmented reality experience to the human eye.

In some embodiments, the optical path adjustment element 1070 may correspond to the light source assembly 1050, to adjust optical properties of the light emitted by the light source assembly 1050 (such as propagation path, focal length, and other optical characteristics). In some embodiments, the optical path adjustment element 1070 may include an optical assembly 1060, and the optical assembly 1060 may include a first optical element 1061 and a second optical element 1062 arranged along a third axis 1913. These elements possess an equivalent focal length for the light 1900 to adjust the focal length of the light 1900. The first optical element 1061 may be positioned on the frame 1010, and the second optical element 1062 may move relative to the first optical element 1061 to adjust the equivalent focal length of the optical assembly 1060.

Figure 2:
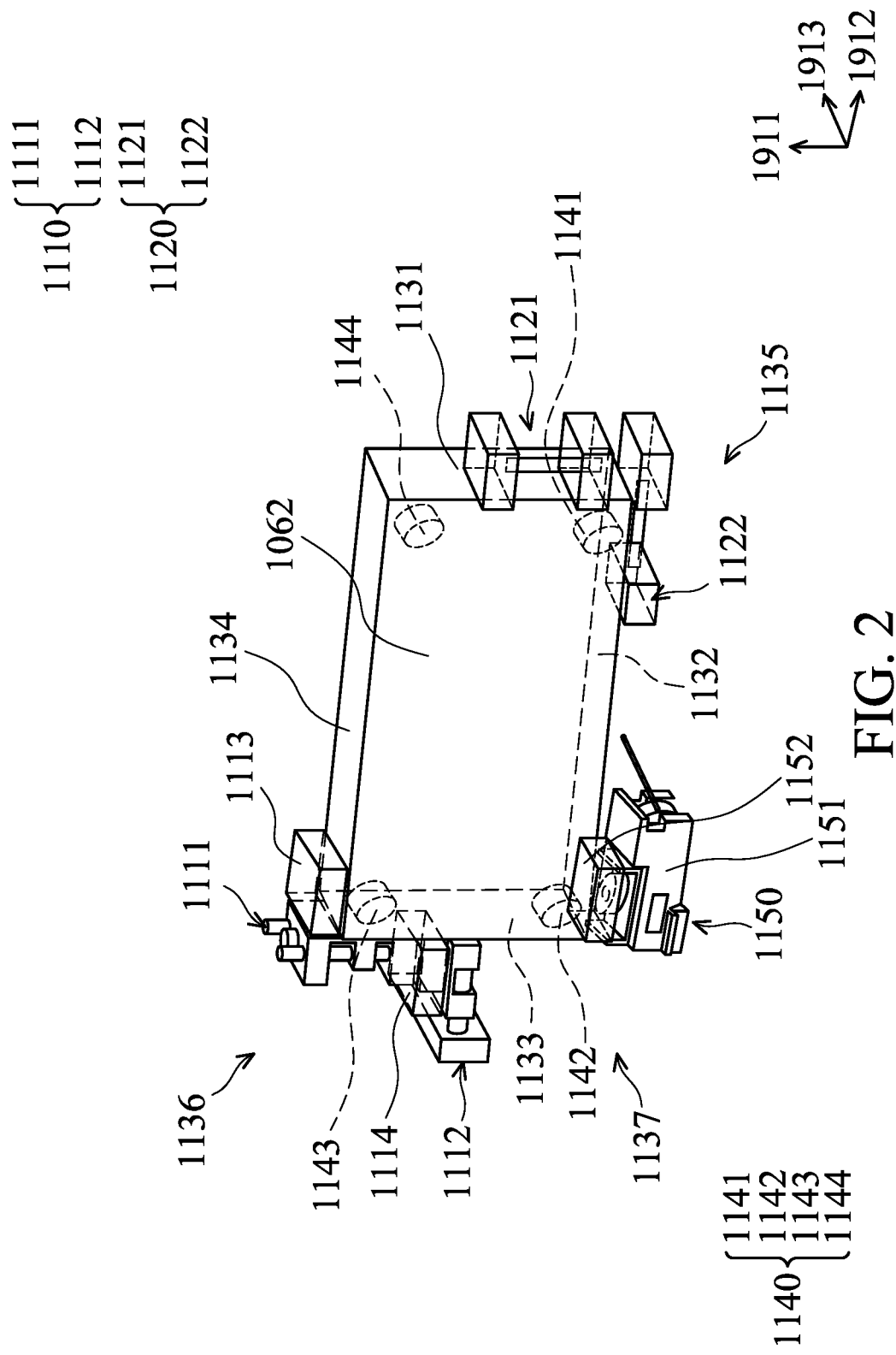
FIG. 2 illustrates a schematic view of some elements of the in some embodiments.

FIG. 2 illustrates a schematic view of some elements of the in some embodiments, which mainly shows the second optical element 1062 and other adjacent elements. As shown in FIG. 2, the optical system 1000 also includes a driving assembly 1110 (a part of the optical path adjustment element 1070) and a guiding assembly 1120 positioned on the second optical element 1062. The driving assembly 1110 may be used to drive the second optical element 1062 to move relative to the first optical element 1061, and the guiding assembly 1120 may be used to guide the moving direction of the second optical element 1062 relative to the first optical element 1061 during its movement.

In some embodiments, the driving assembly 1110 may include a first driving element 1111 and a second driving element 1112. The guiding assembly 1120 may include a first guiding element 1121 and a second guiding element 1122 disposed on the second optical element 1062. For instance, the second optical element 1062 may have a polygonal shape with a first side 1131, a second side 1132, a third side 1133, and a fourth side 1134. In some embodiments, the first side 1131 is adjacent to the second side 1132, the second side 1132 is adjacent to the third side 1133, the third side 1133 is adjacent to the fourth side 1134, and the fourth side 1134 is adjacent to the first side 1131. In some embodiments, the first guiding element 1121 may be disposed on the first side 1131, the second guiding element 1122 may be disposed on the second side 1132, the first driving element 1111 may be disposed on the fourth side 1134, and the second driving element 1112 may be disposed on the third side 1133.

In addition, the corner formed by the first side 1131 and the second side 1132 may be defined as a first corner 1135, while the corner formed by the third side 1133 and the fourth side 1134 may be defined as a second corner 1136. In some embodiments, the first guiding element 1121 and the second guiding element 1122 may be disposed on the first corner 1135, and the first driving element 1111 and the second driving element 1112 may be disposed on the second corner 1136. By disposing the driving assembly 1110 and the guiding assembly 1120 diagonally across the second optical element 1062, the forces applied to the second optical element 1062 may be balanced, thereby avoiding rotation of the second optical element 1062 during movement.

In some embodiments, the first driving element 1111 may be used to drive the second optical element 1062 to move along a first axis 1911, and the second driving element 1112 may be used to drive the second optical element 1062 to move along a second axis 1912. The first guiding element 1121 and the second guiding element 1122 may include guide rods. The first guiding element 1121 may extend along the first axis 1911, and the second guiding element 1122 may extend along the second axis 1912, respectively, to guide the movement of the second optical element 1062 along the first axis 1911 or the second axis 1912 during its motion.

In some embodiments, the second driving element 1112, the first guiding element 1121, and the second guiding element 1122 may simultaneously contact the frame 1010 (not shown in FIG. 2 for simplicity). In some embodiments, the first driving element 1111 may be disposed on the second driving element 1112. Specifically, a first connecting element 1113 of the first driving element 1111 may directly contact the second optical element 1062, while a second connecting element 1114 of the second driving element 1112 may directly contact the first driving element 1111. Accordingly, when the first driving element 1111 is driven, it can drive the second optical element 1062 to move along the first axis 1911. When the second driving element 1112 is driven, it can drive the second optical element 1062 to move together with the first driving element 1111 along the second axis 1912. In some embodiments, the first driving element 1111 and the second driving element 1112 may include elements such as piezoelectric elements, magnetic coils, and the like.

In some embodiments, as shown in FIG. 1, the first optical element 1061 and the second optical element 1062 may be disposed along the third axis 1913. It should be noted that the first axis 1911, the second axis 1912, and the third axis 1913 may be orthogonal to each other, meaning that the direction of movement of the second optical element 1062 is perpendicular to the direction in which the first optical element 1061 and the second optical element 1062 are arranged.

Figure 3:
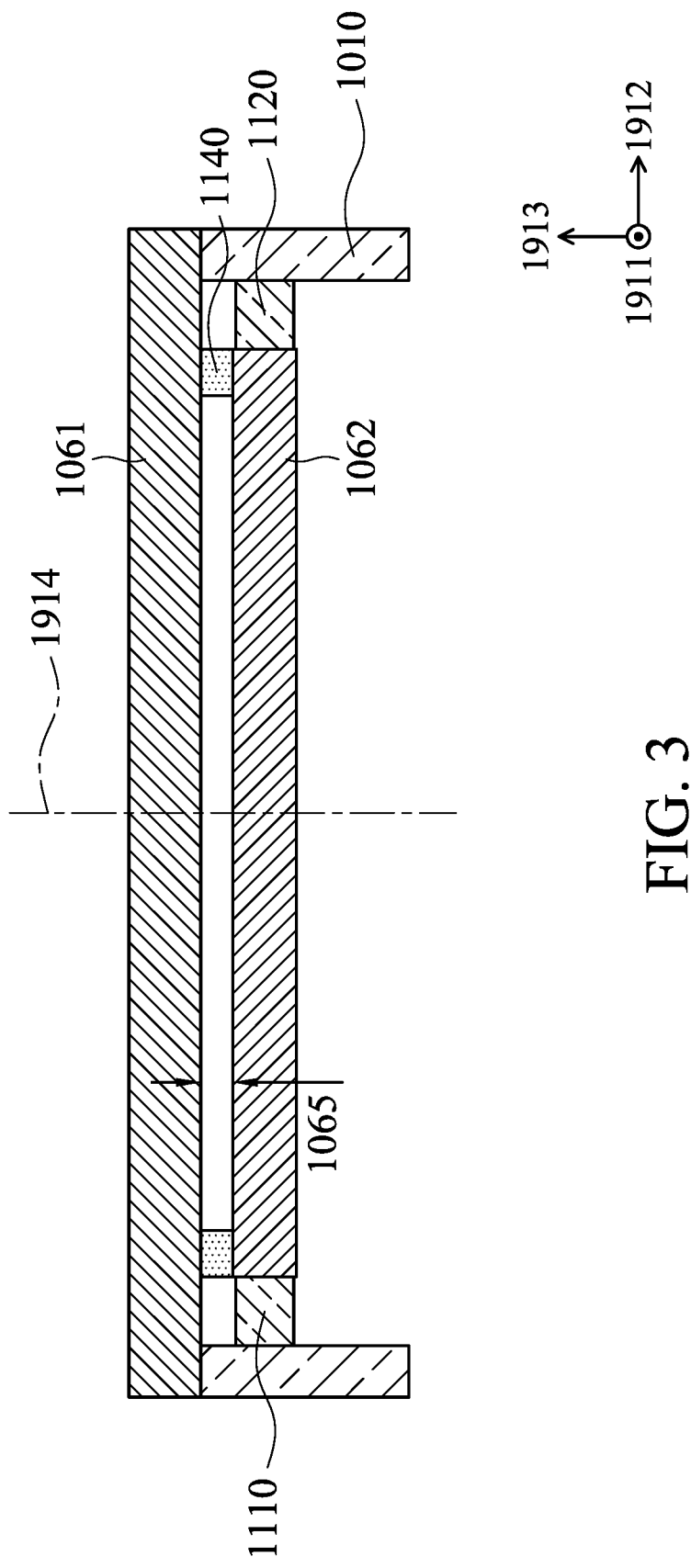
FIG. 3 is a cross-sectional view of some elements of the optical system.

FIG. 3 is a cross-sectional view of some elements of the optical system 1000, which mainly shows the first optical element 1061, the second optical element 1062, and neighboring elements. As illustrated in FIG. 3, in some embodiments, a buffering assembly 1140 may be disposed between the first optical element 1061 and the second optical element 1062 to movably connect the first optical element 1061 and the second optical element 1062. This enables the second optical element 1062 to move relative to the first optical element 1061. As shown in FIG. 2, the buffering assembly 1140 may include buffering elements 1141, 1142, 1143, and 1144 disposed at the corners of the second optical element 1062. For instance, the buffering element 1141 may be disposed at the first corner 1135, while the buffering element 1143 may be disposed at the second corner 1136. In some embodiments, the buffering assembly 1140 may include elements such as spheres, elastic materials (e.g., gel), and the like.

In some embodiments, as illustrated in FIG. 3, a gap 1065 may exist between the first optical element 1061 and the second optical element 1062, wherein the buffering assembly 1140 may be disposed within the gap 1065. In some embodiments, the gap 1065 may be less than 0.1 mm to achieve miniaturization. In some embodiments, an axis passes through the first optical element 1061, the second optical element 1062, and is parallel to the third axis 1913, may be defined as a main axis 1914. In such cases, the driving assembly 1110 may be utilized to drive the second optical element 1062 in a direction perpendicular to the main axis 1914.

In some embodiments, as shown in FIG. 2, a locking assembly 1150 may also be disposed on the second optical element 1062 to secure the position of the second optical element 1062 when the driving assembly 1110 is not operational. In some embodiments, the locking assembly 1150 may be disposed at the second side 1132 and a third corner 1137, wherein the third corner 1137 is defined by the intersection of the second side 1132 and the third side 1133.

For example, the locking assembly 1150 may include a locking element 1151 and a locking connection element 1152. The locking element 1151 may be disposed on the frame 1010 (not shown in FIG. 2), and the locking connection element 1152 may be disposed on the locking element 1151, and selectively connect the second optical element 1062. When the state of the locking connection element 1152 is "open," the second optical element 1062 may move relative to the locking assembly 1150. Conversely, when the state of the locking connection element 1152 is "closed," the second optical element 1062 cannot move relative to the locking assembly 1150, thus fixedly connecting the second optical element 1062 to the locking assembly 1150. Accordingly, overall reliability can be enhanced, and the user's optimal viewing area can be defined as the position where the locking assembly 1150 is locked, eliminating the need for the driving assembly 1110 to secure the second optical element 1062. This achieves power-saving and low-power consumption effects, and prevents damage to the second optical element 1062 when the user moves. In some embodiments, the locking assembly 1150 can be locked using principles such as a Voice Coil Motor (VCM) or an electromagnetic valve.

In some embodiments, the sensing assembly 1080 may be disposed on the frame 1010 to sense the environment outside the optical system 1000. For example, as illustrated in FIG. 3, the sensing assembly 1080 may include a first sensing element 1081, a second sensing element 1082, and a third sensing element 1083, which may be disposed on different sides of the second optical element 1062. For instance, the first sensing element 1081 may be disposed on the second side 1132, the second sensing element 1082 may be disposed on the third side 1133, and the third sensing element 1083 may be disposed on the fourth side 1134. It should be noted that the optical system 1000 may have two sets of sensing assembly 1080, corresponding to the user's left and right eyes.

Figure 4:
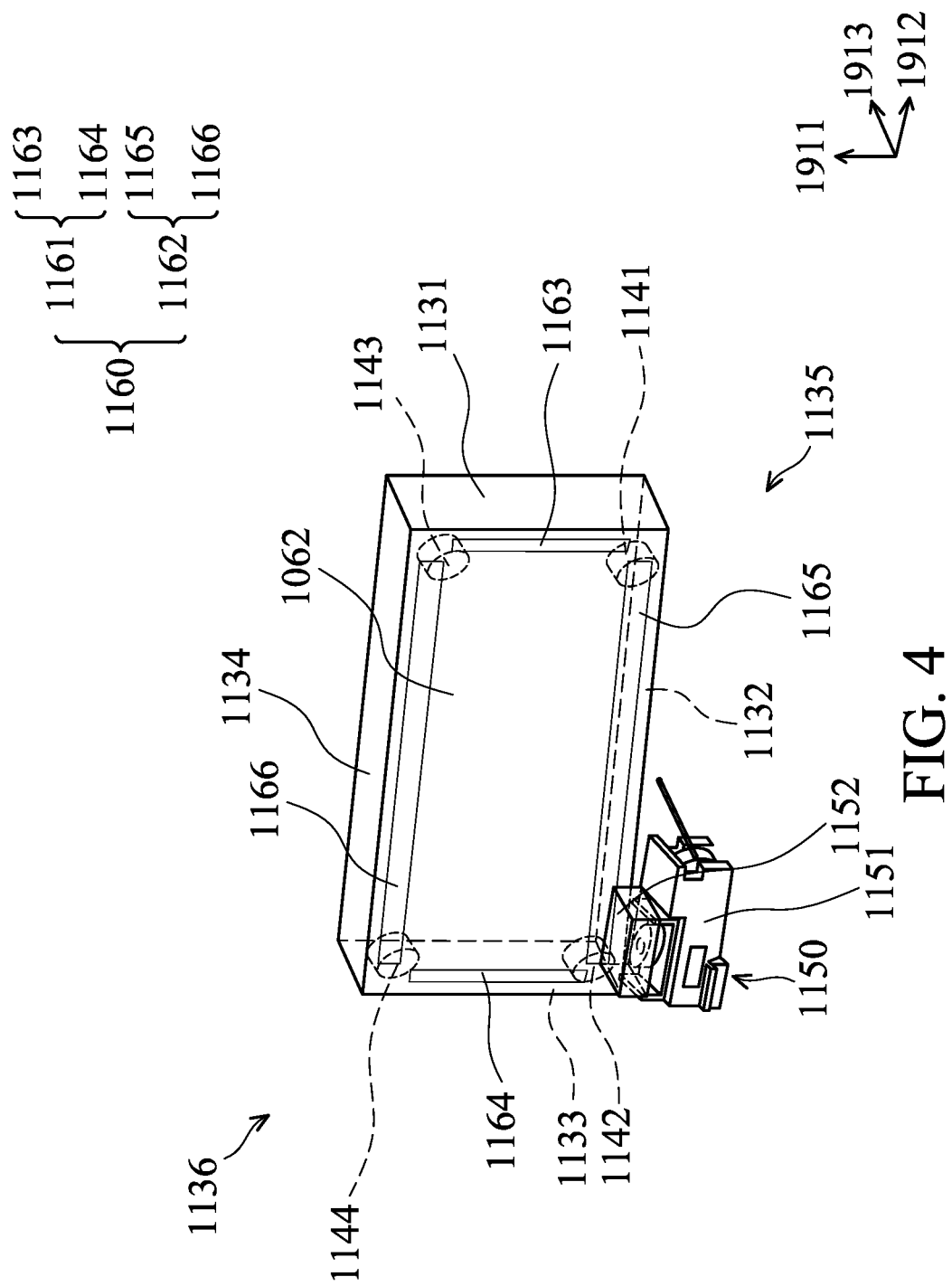
FIG. 4 is a schematic view of some elements of the optical system in other embodiments.
Figure 5:
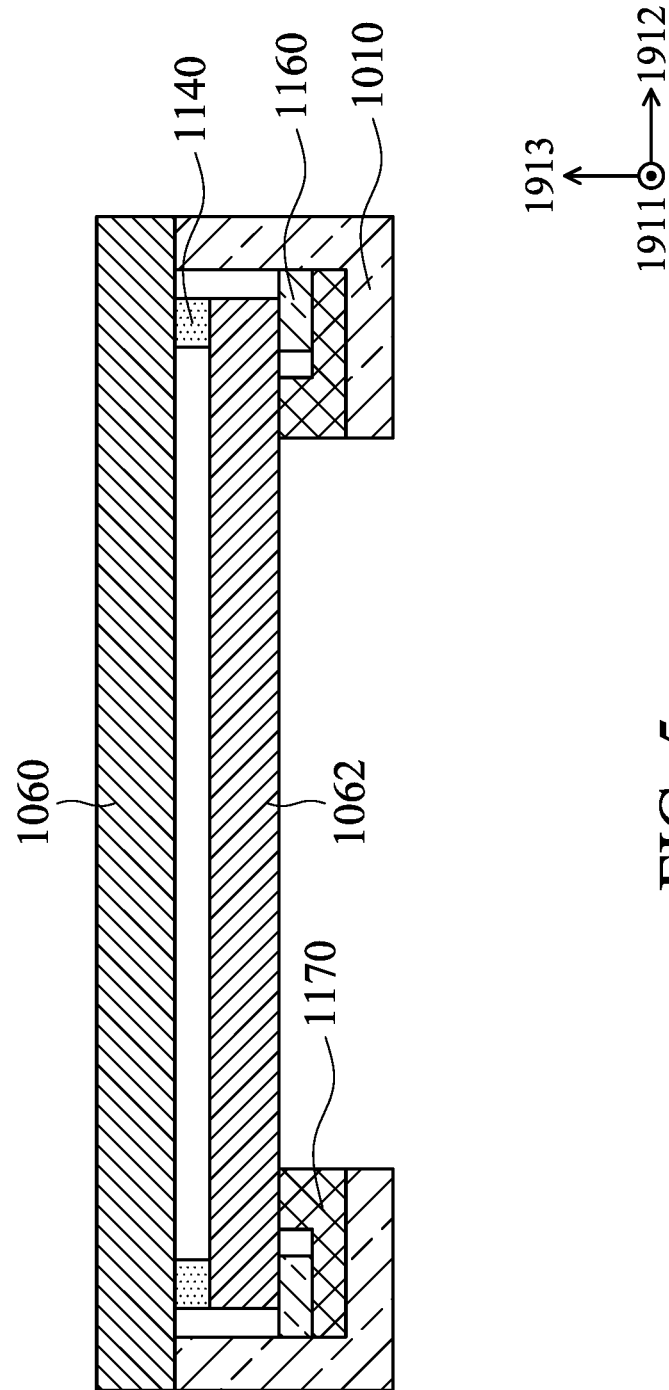
FIG. 5 is a cross-sectional view of some elements of the optical system in other embodiments.

FIG. 4 is a schematic view of some elements of the optical system 1000 in other embodiments, and FIG. 5 is a cross-sectional view of some elements of the optical system 1000 in other embodiments, primarily showing the second optical element 1062 and other elements nearby. Unlike the embodiments in FIG. 2 and FIG. 3, the embodiments in FIG. 4 and FIG. 5 use a driving assembly 1160 instead of the driving assembly 1110 and the guiding assembly 1120. The driving assembly 1160 may include a first driving element 1161 and a second driving element 1162. The first driving element 1161 may include a first driving unit 1163 and a second driving unit 1164, while the second driving element 1162 may include a third driving unit 1165 and a fourth driving unit 1166. The first driving element 1161 may be used to drive the second optical element 1062 to move relative to the first optical element 1061 along the first axis 1911, and the second driving element 1162 may be used to drive the second optical element 1062 to move relative to the first optical element 1061 along the second axis 1912.

In some embodiments, as shown in FIG. 4, the first driving unit 1163 may be disposed on the first side 1131, the second driving unit 1164 may be disposed on the third side 1133, the third driving unit 1165 may be disposed on the second side 1132, and the fourth driving unit 1166 may be disposed on the fourth side 1134. In certain embodiments, as shown in FIG. 5, one end of the driving assembly 1160 may be disposed on the second optical element 1062, while the other end may be disposed on the resilient element 1170. In some embodiments, the driving assembly 1160 may include shape memory alloy that contracts when energized, thereby allowing movement of the second optical element 1062 along the first axis 1911 and the second axis 1912. In some embodiments, the resilient element 1170 may be disposed on the second optical element 1062 and the frame 1010 to provide resilience for returning the second optical element 1062 to its initial position when the driving assembly 1160 is not energized, reducing the need for additional power to the driving assembly 1160 and lowering power consumption.

Figure 6:
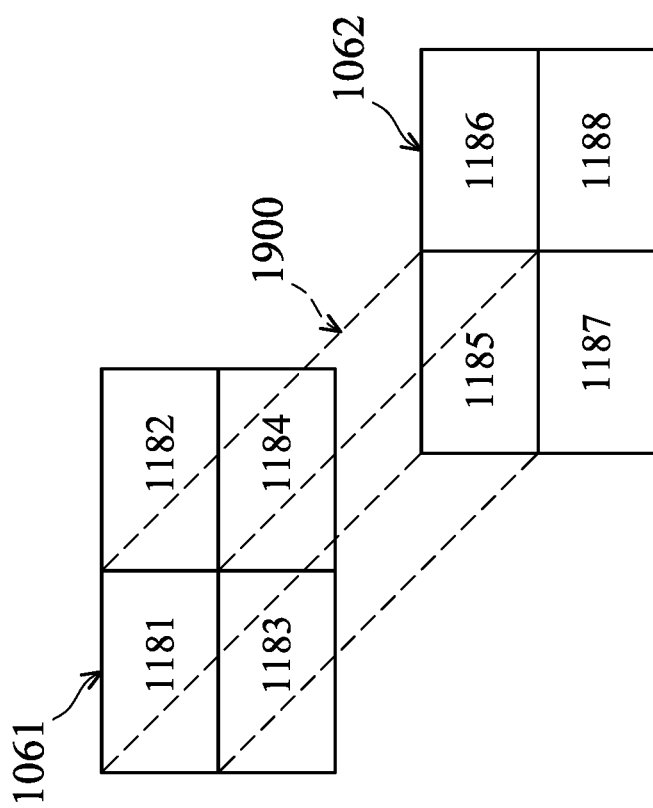
FIG. 6 is a schematic view of the arrangement of the first optical element and the second optical element.

FIG. 6 is a schematic view of the arrangement of the first optical element 1061 and the second optical element 1062. As shown in FIG. 6, the first optical element 1061 may include multiple regions 1181, 1182, 1183, and 1184, while the second optical element 1062 may include multiple regions 1185, 1186, 1187, and 1188. In some embodiments, the second optical element 1062 may be movable relative to the first optical element 1061, allowing the light 1900 to pass through one region of the first optical element 1061 and one region of the second optical element 1062, for example, regions 1181 and 1185 as illustrated in FIG. 6. It should be noted that the number and arrangement of regions here are provided as examples and are not limited thereto. The actual number and arrangement of regions in the first optical element 1061 and the second optical element 1062 can be adjusted according to the requirements.

Figure 7A:
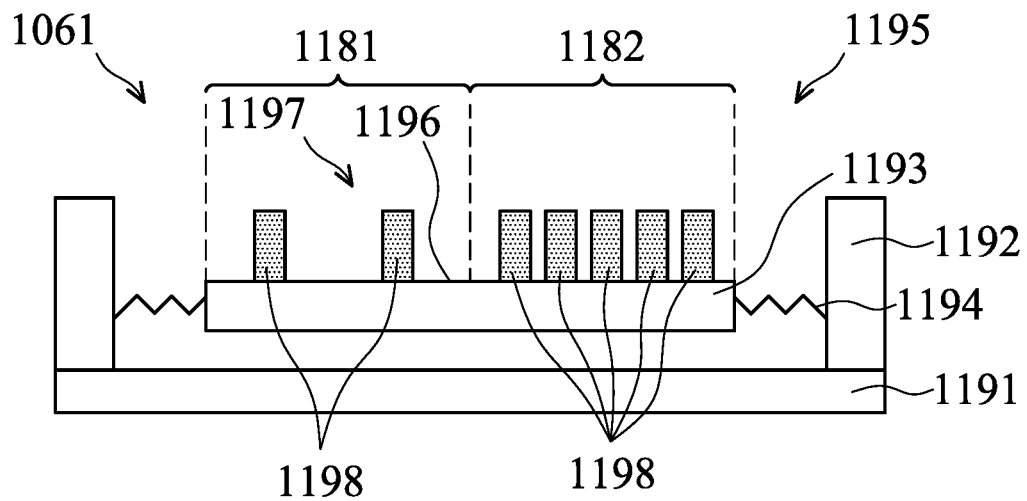
FIG. 7A is a cross-sectional view of a first optical element.

FIG. 7A is a cross-sectional view of a first optical element 1061. As shown in FIG. 7A, the first optical element 1061 may have a first substrate 1191 and a first dielectric layer 1192 disposed on the first substrate 1191. The first dielectric layer 1192 may have a first opening 1195, and a first optical unit 1193 and a first elastic unit 1194 are formed in the first opening 1195. The first optical unit 1193 may include a transparent material and may be movably connected to the first dielectric layer 1192 through the first elastic unit 1194. The first elastic unit 1194 may include a metallic material. The first optical unit 1193 may have a first surface 1196, and a plurality of first structure 1197 are formed on the first surface 1196. The first structure 1197, for example, could be a plurality of first protrusion 1198 (such as columnar protrusions) extending from the first surface 1196. In some embodiments, the first protrusion 1198 in different regions may have different arrangement periods (densities). For instance, in region 1181, they may have a lower arrangement period, while in region 1182, they may have a higher arrangement period. In some embodiments, the first protrusion 1198 in different regions may also have different heights, with heights possibly being less than 1 μm.

Figure 7B:
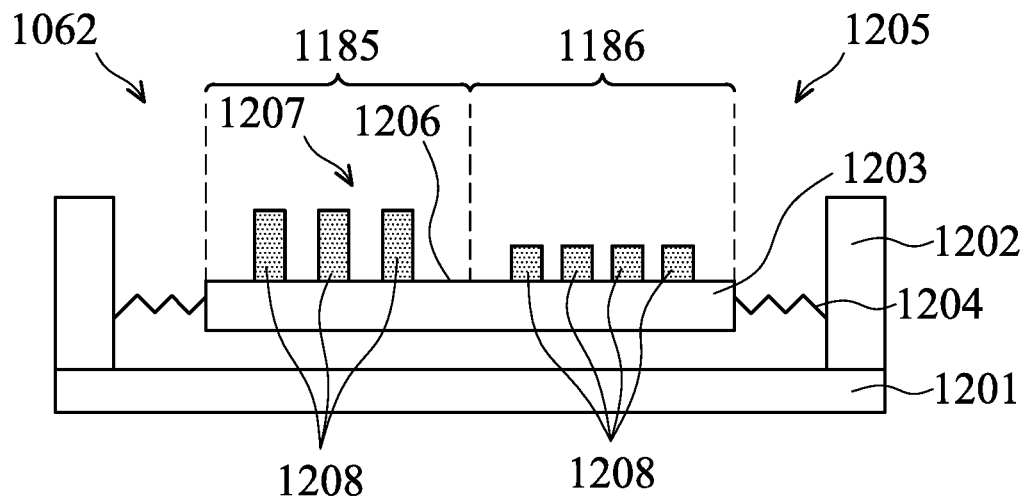
FIG. 7B is a cross-sectional view of a second optical element.

FIG. 7B is a cross-sectional view of a second optical element 1062. As shown in FIG. 7B, the second optical element 1062 may have a second substrate 1201 and a second dielectric layer 1202 disposed on the second substrate 1201. The second dielectric layer 1202 may have a second opening 1205, and a second optical unit 1203 and a second elastic unit 1204 are formed in the second opening 1205. The second optical unit 1203 may include a transparent material and may be movably connected to the second dielectric layer 1202 through the second elastic unit 1204. The second elastic unit 1204 may include a metallic material. The second optical unit 1203 may have a second surface 1206, and a plurality of second structure 1207 are formed on the second surface 1206. The second structure 1207, for example, could be a plurality of second protrusion 1208 (such as columnar protrusions) extending from the second surface 1206. In some embodiments, the second protrusion 1208 in different regions may have different arrangement periods (densities). For instance, in region 1185, they may have a lower arrangement period, while in region 1186, they may have a higher arrangement period. In some embodiments, the second protrusion 1208 in different regions may also have different heights, with heights possibly being less than 1 μm.

In some embodiments, the spacing between the protrusions of the first structure 1197 and the second structure 1207 is close to the wavelength of visible light (400 nm to 700 nm). This allows for the alteration of the direction of the light 1900 by diffraction, thereby enabling the modification of the focal length of the light 1900.

In some embodiments, the first optical element 1061 and the second optical element 1062 may be formed using Micro Electro Mechanical Systems (MEMS) processes. In some embodiments, the first structure 1197 and the second structure 1207 may be formed through exposure, development, etching, and other methods. In some embodiments, the ratio of the height of the first structure 1197 or the second structure 1207 to the height of the first optical element 1061 or the second optical element 1062 may be less than 0.01. For instance, when the height of the first optical element 1061 or the second optical element 1062 is less than 100 μm, the height of the first structure 1197 or the second structure 1207 may be less than 1 μm. In some embodiments, when the first optical element 1061 and the second optical element 1062 act as convex lenses, as compared to conventional geometric optics-based convex lenses, the first optical element 1061 and the second optical element 1062, which modify light paths using quantum optics methods, may reduce thickness to below 10%. Furthermore, compared to traditional convex lenses, the first optical element 1061 and the second optical element 1062 can achieve similar functions with smaller areas, thereby reducing the weight of the optical system 1000 and achieving miniaturization.

Referring back to FIG. 6. Since the first structure 1197 of the regions 1181, 1182, 1183, and 1184 of the first optical element 1061 and the second structure 1207 in the regions 1185, 1186, 1187, and 1188 of the second optical element 1062 have different periods, when different regions 1181, 1182, 1183, and 1184 match different regions 1185, 1186, 1187, and 1188, the focal length of the light 1900 varies accordingly. For instance, when the light 1900 passes through the region 1181 and the region 1185 (with the second optical element 1062 in the first position), its equivalent focal length may be a first focal length. Conversely, as the light 1900 passes through the region 1181 and the region 1186 (with the second optical element 1062 in the second position), its equivalent focal length could be a second focal length which is different from the first focal length. Thus, by adjusting the relative positioning of the first optical element 1061 and the second optical element 1062, it is possible to alter the focal length of the light 1900. It is important to note that since the motion direction of the second optical element 1062 relative to the first optical element 1061 is perpendicular to the arrangement direction of the first optical element 1061 and the second optical element 1062, space requirements along the arrangement direction of the first optical element 1061 and the second optical element 1062 may be reduced and thus achieving miniaturization.

Figure 8A:
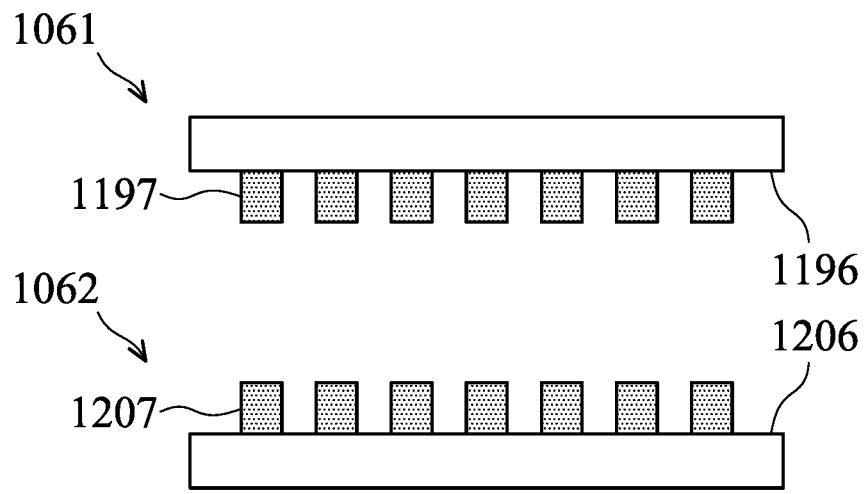
FIG. 8A and FIG. 8B are schematic views illustrating arrangements of the first optical element and the second optical element in some embodiments.
Figure 8B:
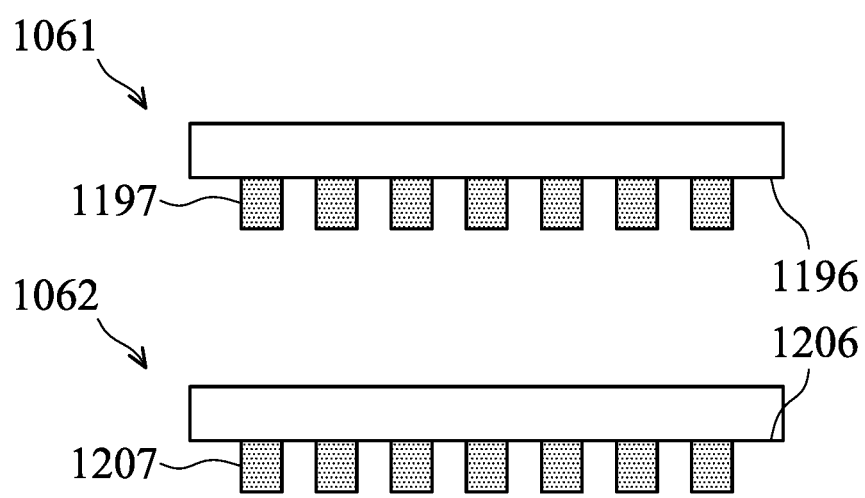

FIG. 8A and FIG. 8B are schematic views illustrating arrangements of the first optical element 1061 and the second optical element 1062 in some embodiments. As shown in FIG. 8A, the first surface 1196 may face the second surface 1206. Alternatively, as shown in FIG. 8B, the first surface 1196 and the second surface 1206 may face toward an identical direction. By disposing the first structure 1197 and the second structure 1207 only on a single surface of the first optical element 1061 and the second optical element 1062, the cost may be reduced.

Figure 8C:
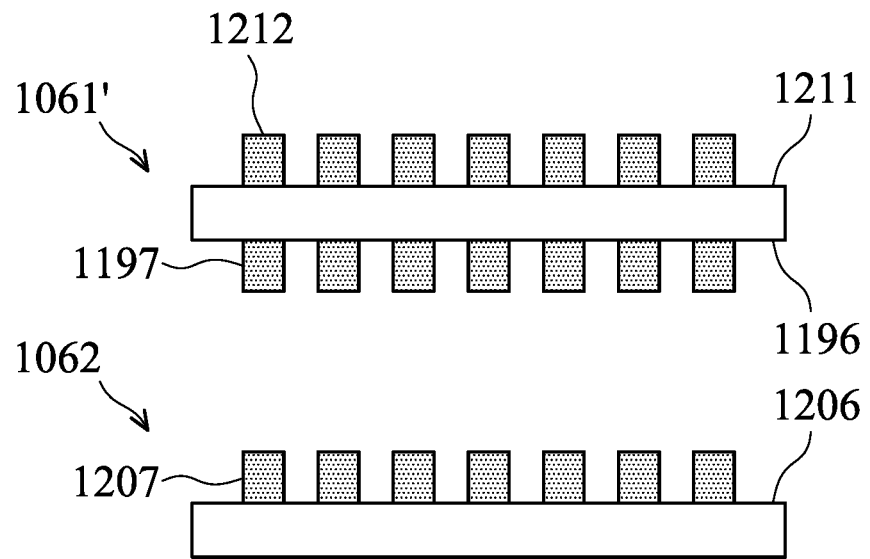
FIG. 8C is a schematic view of an arrangement of a first optical element and the second optical element in another embodiment.

FIG. 8C is a schematic view of an arrangement of a first optical element 1061' and the second optical element 1062 in another embodiment. In contrast to the first optical element 1061, the first optical element 1061' has third structure 1212 on a third surface 1211 faces an opposite direction to the first surface 1196. By providing additional third structure 1212, the characteristics of the first optical element 1061' may be enhanced, such as providing a better focusing effect.

Figure 8D:
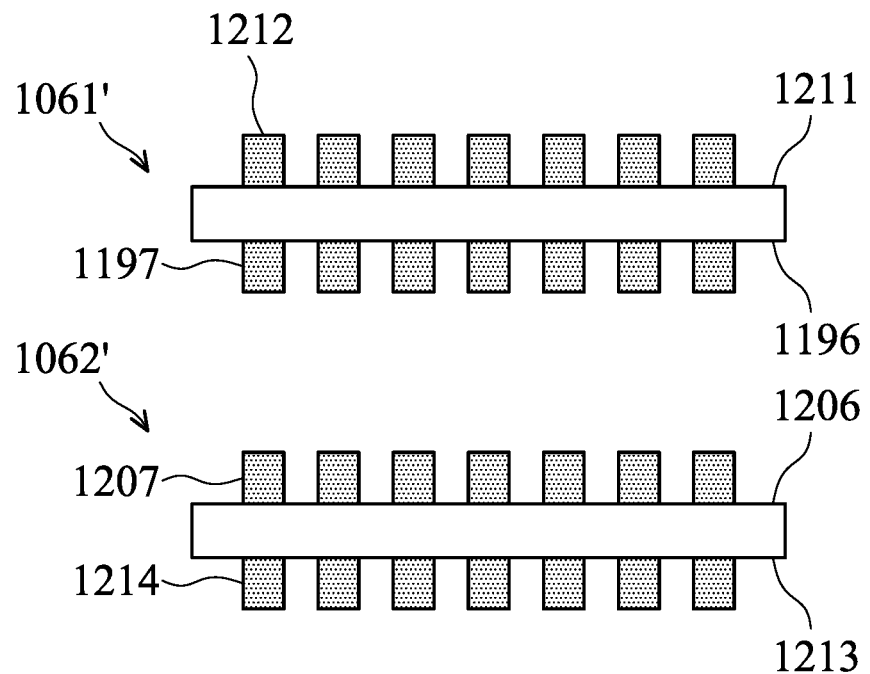
FIG. 8D is a schematic view of an arrangement of a first optical element and the second optical element in another embodiment.

FIG. 8D is a schematic view of an arrangement of a first optical element 1061' and the second optical element 1062' in another embodiment. In contrast to the second optical element 1062, the second optical element 1062' has fourth structure 1214 on a fourth surface 1213 faces an opposite direction to the second surface 1206. By providing additional fourth structure 1214, the characteristics of the second optical element 1062' may be enhanced, such as providing a better focusing effect.

Please note that the aforementioned third structure 1212 and fourth structure 1214 may be similar to the first structure 1197 and the second structure 1207. For instance, they may have heights less than 1 μm and may exhibit periodicity. Furthermore, the third surface 1211 and fourth surface 1213 may also be perpendicular to the main axis 1914. In some embodiments, the first structure 1197, the second structure 1207, the third structure 1212, and the fourth structure 1214 may have different periods, including different spacing.

In some embodiments, similar effects may be achieved through different types of the first optical element 1061 and the second optical element 1062. For example, the first optical element 1061 and the second optical element 1062 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

Figure 9:
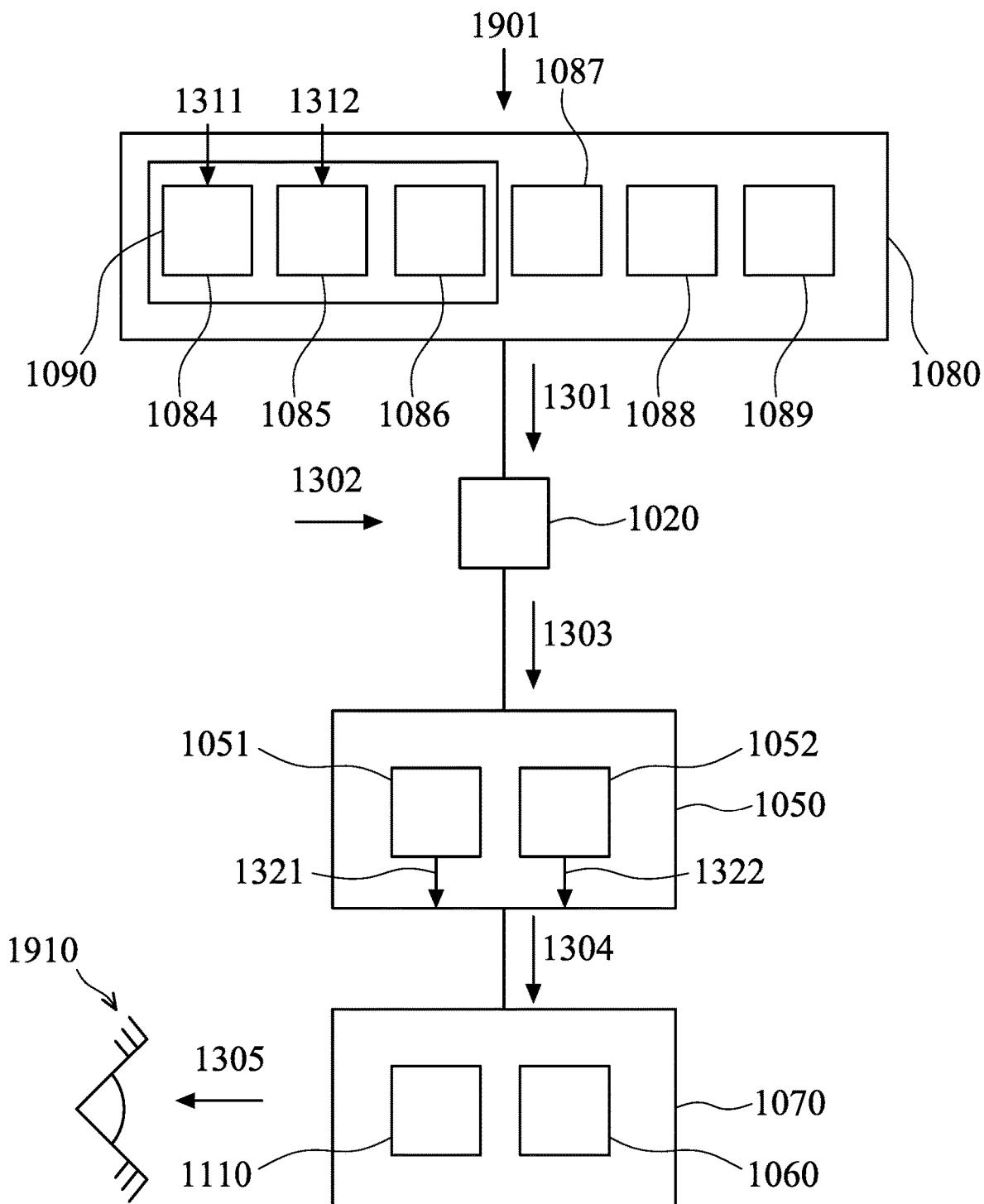
FIG. 9 illustrates a schematic view of the operation of various elements within the optical system.

FIG. 9 illustrates a schematic view of the operation of various elements within the optical system 1000. As shown in FIG. 9, the sensing assembly 1080 may sense the external environment of the optical system 1000, such as external light 1901, and convert this information into a sensing signal 1301 to provide to a control element 1020. The control element 1020 may create a simulated message including information about the external environment based on the sensing signal 1301. Furthermore, in some embodiments, initial indication signal 1302 may be provided based means outside the optical system 1000, such as based on user requirements, software, apps, etc. Subsequently, the control element 1020 provides a first control signal 1303 to the light source assembly 1050 based on the simulated message and the initial indication signal 1302. The light source assembly 1050 provides an initial image 1304 to the optical path adjustment element 1070 according to the first control signal 1303. The optical path adjustment element 1070 transforms the initial image 1304 into a target image 1305 for presentation to the eye 1910.

In some embodiments, the sensing assembly 1080 may include a first imaging element 1084, a second imaging element 1085, a light intensity sensing element 1086, a eye tracking assembly 1087, a depth sensing assembly 1088, and a inertial sensing assembly 1089. The aforementioned elements, for example, may be the first sensing element 1081, the second sensing element 1082, or the third sensing element 1083 as shown in FIG. 1. In some embodiments, the first imaging element 1084, the second imaging element 1085, the light intensity sensing element 1086, the eye tracking assembly 1087, the depth sensing assembly 1088, and the inertial sensing assembly 1089 may be disposed on the aforementioned frame 1010 (not shown in FIG. 9).

In some embodiments, the first imaging element 1084, the second imaging element 1085, and the light intensity sensing element 1086 may collectively be referred to as a image sensing assembly 1090, which incorporates image information from the output sensing signal 1301. In some embodiments, the first imaging element 1084 may be utilized to capture a first external image 1311 from the external light 1901, while the second imaging element 1085 may be utilized to capture a second external image 1312 from the external light 1901, and convert them into the first image signal and the second image signal (parts of the sensing signal 1301). In some embodiments, there is a distance of at least greater than 1 cm between the centers of the first imaging element 1084 and the second imaging element 1085, such as the two first sensing element 1081 in FIG. 1 corresponding to the left and right eye of a user, to simulate human eyes and generate 3D virtual images. The light intensity sensing element 1086 may be used to sense the intensity of the external light 1901 and compute the light intensity sensing signal (a part of the sensing signal 1301), which is provided to the control element 1020.

Figure 10:
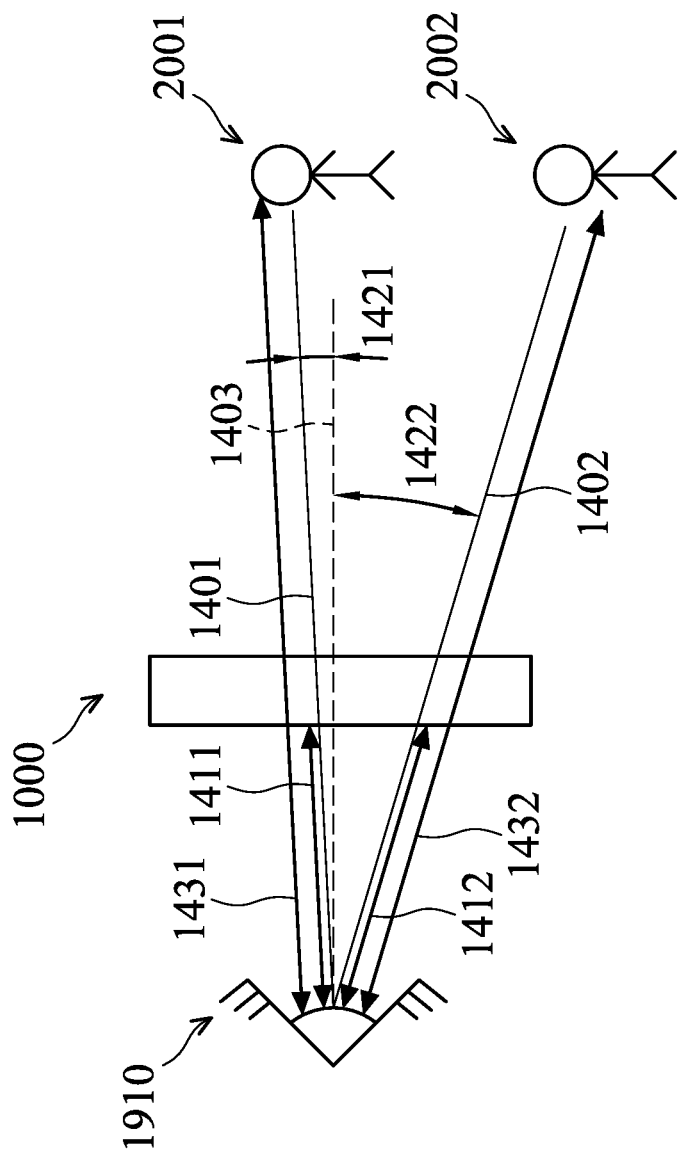
FIG. 10 is a schematic view of the eye observing objects at different positions through the optical system.

In some embodiments, the eye tracking assembly 1087 may be used to sense the condition of a user's eyes, and based on the condition of the eyes, output signals such as eye distance signals, sight signals, and focus position signals (they are parts of the sensing signal 1301). The eye distance signal may include information about the distance between the eye and the optical system 1000. For example, FIG. 10 is a schematic view of the eye 1910 observing objects at different positions through the optical system 1000. As shown in FIG. 10, when the eye 1910 observes a first object 2001 located at a first position, on a connection 1401 between the eye 1910 and the first object 2001, the distance between the eye 1910 and the optical system 1000 is a first distance 1411. When the eye 1910 observes a second object 2002 located at a second position, on a connection 1402 between the eye 1910 and the second object 2002, the distance between the eye 1910 and the optical system 1000 is a second distance 1412, and the first distance 1411 is different from the second distance 1412. The eye distance signal may include this information.

In addition, when observing the first object 2001 with the eye 1910, the angle between the connection 1401 and a direct line of sight 1403 may be a first viewing angle 1421. When observing the second object 2002 with the eye 1910, the angle between the connection 1402 and the direct line of sight 1403 may be a second viewing angle 1422, and the first viewing angle 1421 and the second viewing angle 1422 may be different. The sight signal may include this information. When observing the first object 2001 with the eye 1910, the distance between the eye 1910 and the first object 2001 may be a first focal length 1431. When observing the second object 2002 with the eye 1910, the distance between the eye 1910 and the second object 2002 may be a second focal length 1432, and the first focal length 1431 may be different from the second focal length 1432. The focus position signal may include this information. By integrating signals such as the eye distance signal, the sight signal, and the focus position signal, errors caused by external objects at different positions can be compensated, achieving a better display effect.

In some embodiments, the depth sensing assembly 1088 may be employed to sense the distance between the and external objects, providing depth sensing signals (a part of the sensing signal 1301). In some embodiments, the inertial sensing assembly 1089 may be utilized to detect the movement of the optical system 1000 relative to the environment, which may include Hall sensors, magnetoresistance effect sensors (MR sensors), giant magnetoresistance effect sensors (GMR sensors), tunneling magnetoresistance effect sensors (TMR sensors), or fluxgate sensors.

In some embodiments, the control element 1020 may calculate depth simulation information based on the aforementioned depth sensing signals, compute 3D simulation information based on the first image signal, the second image signal, the eye distance signal, the sight signal, and the focal position signal, and calculate intensity simulation information based on the light intensity sensing signal (all of them are parts of the first control signal 1303). Furthermore, the control element 1020 may determine the first control signal 1303 based on the aforementioned information and the initial indication signal 1302.

The light source assembly 1050 may include a first light source assembly 1051 and a second light source assembly 1052, which are respectively configured to output the first image 1321 and the second image 1322 based on the first control signal 1303. The first light source assembly 1051 and the second light source assembly 1052, for example, may correspond to the two light source assemblies of the optical system 1000 for the left and right eyes. The first image 1321 and the second image 1322 may be collectively referred to as the initial image 1304. In some embodiments, the center-to-center distance between the first light source assembly 1051 and the second light source assembly 1052 may be greater than 0.5 cm to provide different images for the two eyes. For instance, at the same moment, the first image 1321 and the second image 1322 are different, so a 3D effect may be generated by the disparity between the left and right eyes. Finally, the initial image 1304 are transformed into the target image 1305 by the optical path adjustment element 1070 and then provided to the eye 1910.

Figure 11A:
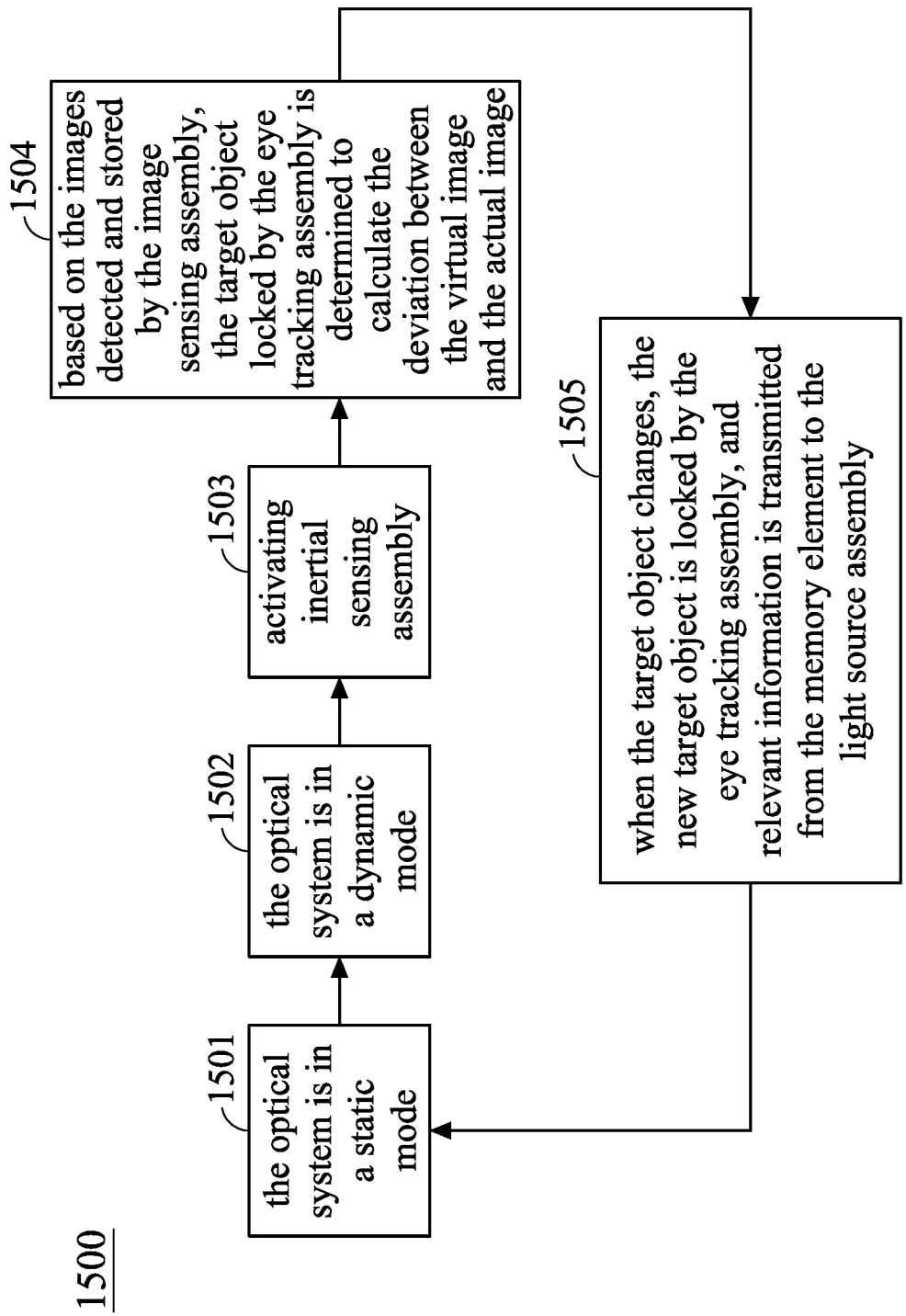
FIG. 11A is a schematic view of a method for operating the optical system.
Figure 12B:
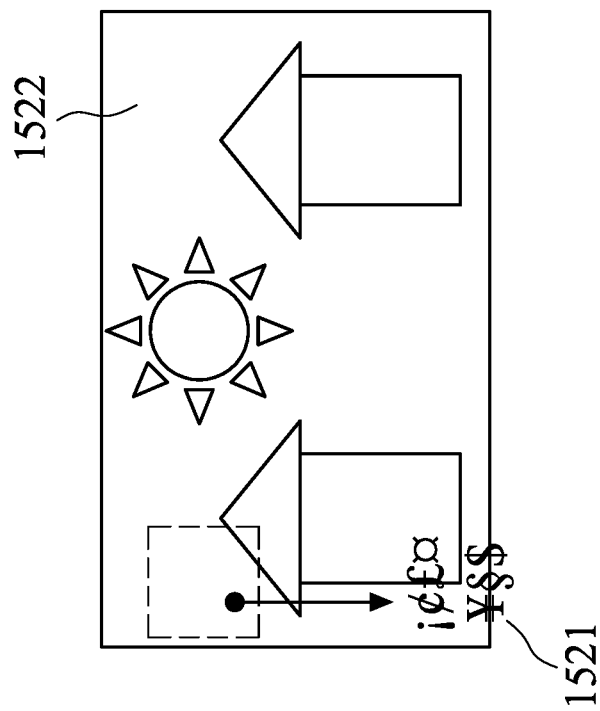
FIG. 12A and FIG. 12B illustrate the positional relationship between the virtual image and the actual image when performing the method to operate the optical system.
Figure 12A:
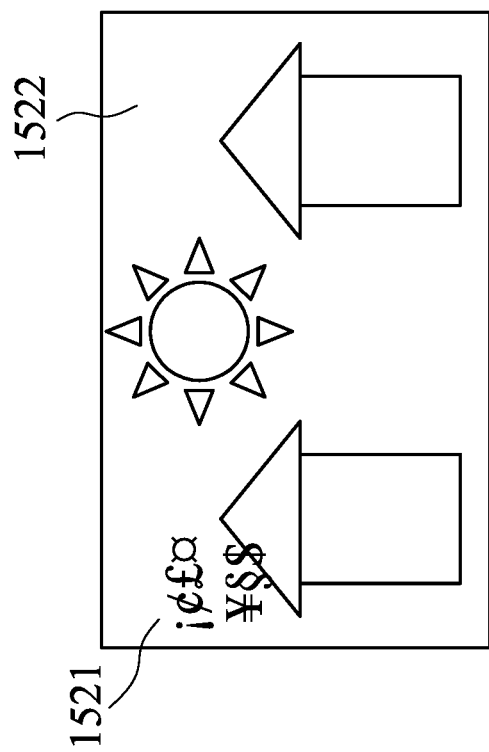

FIG. 11A is a schematic view of a method 1500 for operating the optical system 1000, wherein FIG. 12A and FIG. 12B illustrate the positional relationship between the virtual image 1521 and the actual image 1522 when performing the method 1500 to operate the optical system 1000. In step 1501, the optical system 1000 is in a static mode. Subsequently, in step 1502, when the position of the optical system 1000 changes, it enters a dynamic mode. During this dynamic mode, the position of the virtual image 1521 relative to the actual image 1522 changes. For example, it shifts from the position in FIG. 12A to the position in FIG. 12B. Following that, in step 1503, the inertial sensing assembly 1089 is activated to sense the motion state of the optical system 1000 relative to the external environment. This includes detecting the amount of movement experienced by the optical system 1000 when the user's head or body moves, for instance.

In step 1504, based on the images detected and stored by the image sensing assembly 1090, the target object (e.g., the first object 2001 or the second object 2002) locked by the eye tracking assembly 1087 is determined to calculate the deviation between the virtual image 1521 and the actual image 1522. Subsequently, in step 1505, when the target object changes (e.g., transitioning from the first object 2001 to the second object 2002), the new target object is locked by the eye tracking assembly 1087. Relevant information is transmitted from the memory element 1040 to the light source assembly 1050, allowing the light source assembly 1050 to provide an appropriate initial image 1304, thereby moving the virtual image 1521 from the position in FIG. 12B to the position in FIG. 12A.

Figure 11B:
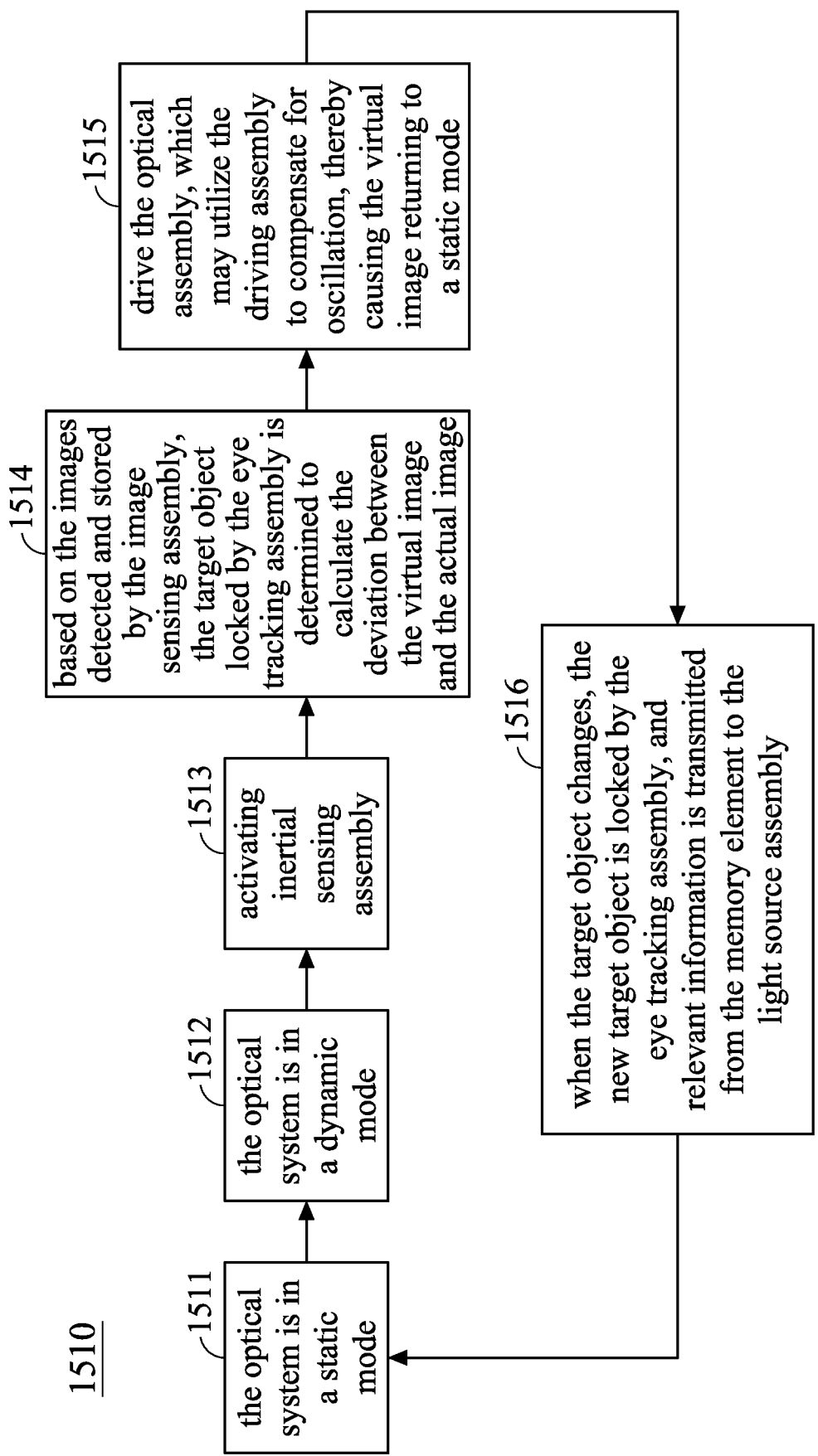
FIG. 11B is a schematic view of a method for operating the optical system.

In some embodiments, in addition to the steps mentioned above, the aforementioned oscillation amount may be compensated by driving the optical assembly 1060. For example, FIG. 11B is a schematic view of a method 1510 for operating the optical system 1000. In step 1511, the optical system 1000 is in a static mode. Subsequently, in step 1512, when the position of the optical system 1000 changes, it enters a dynamic mode. During this dynamic mode, the position of the virtual image 1521 relative to the actual image 1522 changes. For example, it shifts from the position in FIG. 12A to the position in FIG. 12B. Following that, in step 1513, the inertial sensing assembly 1089 is activated to sense the motion state of the optical system 1000 relative to the external environment. This includes detecting the amount of movement experienced by the optical system 1000 when the user's head or body moves, for instance.

In step 1514, based on the images detected and stored by the image sensing assembly 1090, the target object (e.g., the first object 2001 or the second object 2002) locked by the eye tracking assembly 1087 is determined to calculate the deviation between the virtual image 1521 and the actual image 1522. In step 1515, drive the optical assembly 1060, which may utilize the driving assembly 1110 to compensate for oscillation, thereby causing the virtual image 1521 returning to the static mode. This action includes relocating the virtual image 1521 from the position shown in FIG. 12B to the position shown in FIG. 12A. Subsequently, in step 1516, when the target object changes (e.g., transitioning from the first object 2001 to the second object 2002), the new target object is locked by the eye tracking assembly 1087. Relevant information is transmitted from the memory element 1040 to the light source assembly 1050, allowing the light source assembly 1050 to provide an appropriate initial image 1304. By the method 1500 or the method 1510, the embodiment may avoid image displacement caused by user motion.

In summary, an optical system is provided. The optical system includes a light source, a fixed portion, an optical assembly, and a driving assembly. The light source is used for generating light. The optical assembly has an equivalent focal length to the light. The optical assembly includes a first optical element and a second optical element. The driving assembly is used for driving the second optical element to move relative to the first optical element. When the second optical element is at a first position, the equivalent focal length is a first focal length. When the second optical element is at a second position, the equivalent focal length is a second focal length. The first focal length and the second focal length are different. As a result, this can be used to compensate for the positional deviations caused when the user moves, and may also reduce power consumption and achieve miniaturization. Although the aforementioned embodiments are exemplified using augmented reality, the present disclosure is not limited to this. The aforementioned techniques may be applied to optical systems for virtual reality and mixed reality as well, which depends on design requirements.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems. As a result, image stabilization may be significantly improved.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
a light source used for generating light;
a fixed portion;
an optical assembly having an equivalent focal length to the light and comprising a first optical element and a second optical element; and
a driving assembly used for driving the second optical element to move relative to the first optical element, comprising:
a first driving element used for driving the second optical element to move relative to the first optical element in a first axis;
a second driving element used for driving the second optical element to move relative to the first optical element in a second axis; and
a guiding assembly disposed on the second optical element and comprising a first guiding element and a second guiding element;
wherein:
the first axis and the second axis are different;
the second optical element is polygonal;
the second optical element comprises a first side, a second side, a third side, and a fourth side;
the first side and the second side are adjacent;
the second side and the third side are adjacent;
the third side and the fourth side are adjacent;
the fourth side and the first side are adjacent;
the first guiding element is disposed on the first side;
the second guiding element is disposed on the second side.

2. The optical system as claimed in claim 1, wherein:
the first driving element is disposed on the fourth side;
the second driving element is disposed on the third side.

3. The optical system as claimed in claim 2, wherein:
the first guiding element is disposed on a first corner of the second optical element;
the second guiding element is disposed on the first corner.

4. The optical system as claimed in claim 3, wherein:
the first driving element is disposed on a second corner of the second optical element;
the second driving element is disposed on the second corner;
the first corner and the second corner are different.

5. The optical system as claimed in claim 4, wherein:
the first guiding element extends along the first axis;
the second guiding element extends along the second axis.

6. The optical system as claimed in claim 5, further comprising a buffering assembly disposed between the first optical element and the second optical element;
wherein:
the buffering assembly comprises a first buffering element and a second buffering element disposed on the first corner and the second corner, respectively.

7. The optical system as claimed in claim 6, wherein the first buffering element and the second buffering element comprise elastic material.

8. The optical system as claimed in claim 7, further comprising a locking assembly used for fixing the second optical element and disposed on a third corner of the second optical element.

9. The optical system as claimed in claim 8, wherein:
the first corner and the third corner are different;
the second corner and the third corner are different;
the locking assembly is disposed on the second side.

10. The optical system as claimed in claim 9, wherein:
the locking assembly comprises a locking element and a locking connection element;
the locking connection element is fixed on the second optical element;
the locking element is disposed on the locking connection element.

11. The optical system as claimed in claim 10, wherein:
the locking assembly allows the second optical element to move relative to the locking assembly when the driving assembly is in operation;
the locking assembly is fixed on the second optical element when the driving assembly is not in operation.

12. The optical system as claimed in claim 11, wherein:
the first driving element is disposed on the second optical element and used for driving the second optical element to move in the first axis;
the second driving element is disposed on the first driving element and used for driving the first driving element and the second optical element to move together in the second axis.

13. The optical system as claimed in claim 12, wherein:
the first optical element and the second optical element are arranged in a third axis;
the first axis and the third axis are different;
the second axis and the third axis are different.

14. The optical system as claimed in claim 13, wherein:
the first driving element comprises a piezoelectric element;
the second driving element comprises a piezoelectric element;
the first axis and the third axis are perpendicular;
the second axis and the third axis are perpendicular.

15. The optical system as claimed in claim 14, further comprising a sensing assembly, wherein:
the sensing assembly comprises a first sensing element, a second sensing element, and a third sensing element;
the first sensing element and the second sensing element are disposed on different sides of the second optical element;
the first sensing element and the third sensing element are disposed on different sides of the second optical element.

16. The optical system as claimed in claim 15, wherein the second sensing element and the third sensing element are disposed on different sides of the second optical element.

17. An optical system, comprising:
a light source used for generating light;
a fixed portion;
an optical assembly having an equivalent focal length to the light and comprising a first optical element and a second optical element; and
a driving assembly used for driving the second optical element to move relative to the first optical element, comprising:
a first driving element used for driving the second optical element to move relative to the first optical element in a first axis; and
a second driving element used for driving the second optical element to move relative to the first optical element in a second axis;
wherein:
the first axis and the second axis are different;
the first driving element comprises a shape memory alloy;
the second driving element comprises a shape memory alloy;

the first driving element comprises a first driving unit and a second driving unit;

the second driving element comprises a third driving unit and a fourth driving unit;

the second optical element comprises a first side, a second side, a third side, and a fourth side;

the first side and the second side are adjacent;

the second side and the third side are adjacent;

the third side and the fourth side are adjacent;

the fourth side and the first side are adjacent;

the first driving element is disposed on the first side;

the second driving element is disposed on the third side;

the third driving element is disposed on the second side;

the fourth driving element is disposed on the fourth side.

18. The optical system as claimed in claim 17, further comprising a resilient element connecting to the driving assembly;

wherein the resilient element is disposed between the fixed portion and the second optical element.

* * * * *